United States Patent [19]

King et al.

[11] Patent Number: 5,254,645

[45] Date of Patent: Oct. 19, 1993

[54] CLUSTER AZASILACYCLOALKYL FUNCTIONAL POLYSILOXANES

[75] Inventors: Russell K. King; Chi-long Lee, both of Midland, Mich.

[73] Assignee: Dow Corning Corporation, Midland, Mich.

[21] Appl. No.: 938,743

[22] Filed: Sep. 2, 1992

[51] Int. Cl.$^5$ .............................................. C08G 77/26
[52] U.S. Cl. ...................................... 525/479; 528/15; 528/31; 528/32; 528/37; 528/38
[58] Field of Search ................... 525/479; 528/15, 31, 528/32, 38, 37

[56] References Cited

U.S. PATENT DOCUMENTS

| | | |
|---|---|---|
| 2,823,218 | 2/1958 | Speier et al. |
| 3,146,250 | 8/1964 | Speier ................... 556/425 |
| 3,159,601 | 12/1964 | Ashby ................... 528/15 |
| 3,159,662 | 12/1964 | Ashby ................... 518/15 |
| 3,220,972 | 11/1965 | Lamoreaux ............ 528/15 |
| 3,419,593 | 12/1968 | Willing. |
| 3,723,497 | 3/1973 | Baney. |
| 4,575,545 | 3/1986 | Nakos ................... 526/242 |
| 5,110,967 | 5/1992 | King et al. ............ 556/507 |

*Primary Examiner*—Ralph H. Dean, Jr.
*Attorney, Agent, or Firm*—Roger H. Borrousch

[57] ABSTRACT

Cluster azasilacycloalkyl functional polysiloxanes are prepared by combining vinyl-containing polysiloxane, polyfunctional hydrogen polysiloxane, and a platinum catalyst; reacting the combination to produce ≡Si—CH$_2$CH$_2$—Si≡ linkages and substantial amounts of unreacted Si—H groups remain in the reaction product. The Si—H groups in the reaction product are reacted with aliphatically unsaturated azasilacycloalkane forming the cluster compound. These cluster azasilacycloalkyl functional polysiloxanes cure when exposed to moisture to elastomers, sealants, encapsulants, and resins products.

38 Claims, No Drawings

CLUSTER AZASILACYCLOALKYL FUNCTIONAL POLYSILOXANES

BACKGROUND OF THE INVENTION

1. Field of the Invention

This invention relates to polysiloxanes which contain azasilacycloalkyl groups which can react by hydrolysis with minimal evolution of volatile by-products.

2. Background Information

Environmental concerns are influencing the direction of product development. In the field of elastomers, encapsulants, resins, and sealants, there is a need to develop products which produce very low amounts of volatile materials during the curing process, as well as, during the useful life of the cured product. Faced with this problem, the present inventors discovered products which can be used to solve the problem of leaving materials during the curing process and during the useful life of the cured product. One such material is described in our U.S. Pat. No. 5,110,967, issued May 5, 1992. The material in the patent is a composition which, if made and stored in the absence of moisture, will cure when exposed to moisture to a rubbery sealant producing very little material which can volatilize into the environment.

SUMMARY OF THE INVENTION

An object of the present invention is to produce silicon cluster compounds which can be used to make products which cure at room temperature with minimal evolution of volatile materials or production of leachable by-products. This object is accomplished by this invention.

This invention relates to a process for the preparation of a cluster azasilacycloalkyl functional polysiloxane comprising (I) combining (A) a vinyl-containing polysiloxane selected from the group consisting of

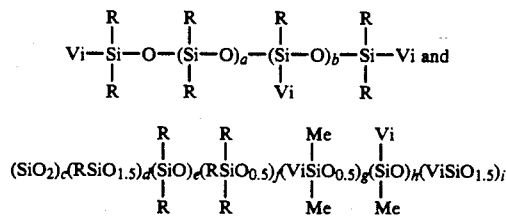

in which each R is an independently selected monovalent hydrocarbon radical or halogenated hydrocarbon radical, Vi is vinyl radical, Me is methyl radical, a has an average value of from 0 to 1000, b has an average value of from 0 to 10, the value of c, d, e, f, g, h, and i being such that the ratio of (R+Me+Vi) per Si is in the range of from 0.5 to 1.8 and the value of g, h, and i being such that there is at least two Vi per molecule, with (B) polyfunctional hydrogen polysiloxane selected from the group consisting of

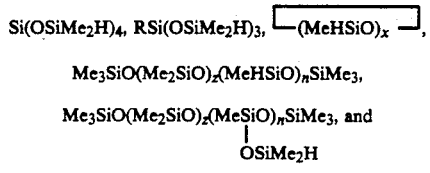

-continued
HMe$_2$SiO(Me$_2$SiO)$_y$(MeHSiO)$_m$SiMe$_2$H in which x has an average value of from 3 to 10 inclusive, y has an average value of from 0 to 100, n has an average value of from 3 to 10 inclusive and m has an average value of from 1 to 10 inclusive, in the presence of (C) a platinum catalyst for the reaction of vinyl with silicon-bonded hydrogen, wherein the ratio of moles of (B) to the moles of (A) exceeds 1.5:1, (II) reacting (A) with (B) in the presence of (C) to obtain a reaction product in which the vinyl radical in (A) reacts with the SiH of (B) to produce ≡Si—CH$_2$CH$_2$—Si≡ bonds, and there remains unreacted SiH groups in the reaction product, and thereafter (III) adding an azasilacyloalkane selected from the group consisting of

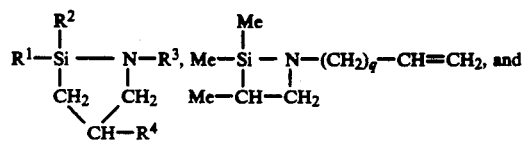

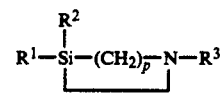

in which q has a value of 1 to 4 inclusive, p has a value of 4 to 6 inclusive, each of R$^1$, R$^2$, and R$^3$ is independently selected from the group consisting of a hydrogen atom, methyl, and an aliphatic unsaturated monovalent hydrocarbon radical, where one of R$^1$, R$^2$, and R$^3$ is a monovalent hydrocarbon radical with olefinic unsaturation or acetylenic unsaturation, wherein there is at least one molecule of azasilacycloalkane per unreacted SiH in the reaction product of (II), and (IV) reacting the azasilacycloalkane with the reaction product of (II) forming a cluster azasilacycloalkyl functional polysiloxane.

Another embodiment of this invention relates to the above process further comprising stripping the reaction product at a temperature >100° C. and a pressure of <1 mm Hg.

Still another embodiment of this invention relates to the above process further comprising storing the reaction products, stripped or unstripped, under conditions which protects it from moisture.

Still another embodiment of this invention relates to the cluster azasilacycloalkyl functional polysiloxanes produced by the above processes. These products are storage stable in a package when protected from moisture but polymerize when removed from the package and exposed to moisture.

DETAILED DESCRIPTION OF THE INVENTION

Reducing the amount of volatile and/or leachable by-products during the curing process of silicone compositions and during the useful life of cured products, such as for sealants, elastomers and resins, is accomplished by tethering a hydrolytically unstable group to a silicon atom.

The process of the present invention prepares cluster azasilacycloalkyl functional polysiloxanes which can be cured to elastomers, sealants, encapsulants, or resin by exposing the cluster azasilacycloalkyl functional polysiloxane to moisture.

The cluster azasilacycloalkyl functional polysiloxanes are prepared by combining vinyl-containing polysiloxanes, (A), with polyfunctional hydrogen polysiloxanes, (B), in the presence of a platinum catalyst (C) such that the resulting reaction product contains unreacted SiH groups. Thereafter, the unreacted SiH groups of the reaction product is reacted with aliphatically unsaturated azasilacyclopentane.

The vinyl-containing polysiloxanes of (A) can be linear polysiloxanes or branched polysiloxanes. The linear vinyl-containing polysiloxanes are those of the following general formula

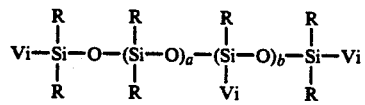

in which each R is an independently selected monovalent hydrocarbon radical or halogenated hydrocarbon radical, Vi is vinyl radical, a has an average value of from 0 to 1000, and b has an average value of from 0 to 10. R can be a monovalent hydrocarbon radical such as alkyl, for example, methyl, ethyl, propyl, butyl, isopropyl, tertiary-butyl, hexyl, and octyl; aryl, such as phenyl; aralkyl, such as benzyl; and alkaryl, such as tolyl and xylyl. R can also be a halogenated monovalent hydrocarbon radical such as 3,3,3-trifluoropropyl or gamma-chloropropyl. The preferred R are methyl, phenyl, and 3,3,3-trifluoropropyl. The preferred vinyl-containing polysiloxanes are those in which b is 0. The preferred linear vinyl-containing polysiloxanes are illustrated by vinyl terminated polydimethylsiloxane where a is 50 to 500.

The vinyl-containing polysiloxane can also be a branched polysiloxane of the following general formula

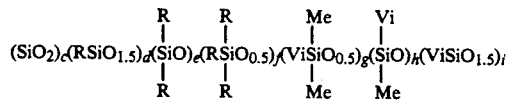

in which R is defined above, Vi is vinyl radical, Me is methyl radical, the value of c, d, e, f, g, h, and i being such that the ratio of (R+Me+Vi) per Si is in the range of from 0.5 to 1.8 and the value of g, h, and i being such that there is at least two Vi per molecule. R is preferably methyl, phenyl, and 3,3,3-trifluoropropyl.

The polyfunctional hydrogen polysiloxanes of (B) are those of the formulae

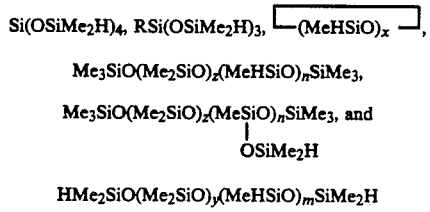

$HMe_2SiO(Me_2SiO)_y(MeHSiO)_mSiMe_2H$ in which x has an average value of from 3 to 10 inclusive, y has an average value of from 0 to 100, n has an average value of from 3 to 10 inclusive and m has an average value of from 1 to 10 inclusive. The preferred polyfunctional hydrogen polysiloxane is $Si(OSiMe_2H)_4$.

For the process of the present invention, (A) and invention, (A) and (B) are present in quantities such that there is at least 1.5 moles of (B) per mole of (A). A preferred class of cluster azasilacycloalkyl functional polysiloxanes is prepared by using one polyfunctional hydrogen polysiloxane molecule of (B) per Si-Vi of (A).

The vinyl-containing polysiloxane of (A) is combined with the polyfunctional hydrogen polysiloxane of (B) in the presence of a platinum catalyst (C). The reaction resulting from this combination is termed an "addition reaction" or a "hydrosilylation reaction" where the vinyl radical of the polysiloxane of (A) reacts with the silicon-bonded hydrogen of (B) such that the Si—H adds across the double bond of the vinyl radical to form ≡Si—CH$_2$CH$_2$—Si≡ linkage. The platinum catalysts are well known in the art for catalyzing this reaction. These platinum catalysts include the chloroplatinic acid described by Speier et al in U.S. Pat. No. 2,823,218, issued Feb. 11, 1958; complexes of chloroplatinic acid with low molecular weight vinyl-containing polydiorganosiloxanes such as syn-divinyltetramethyldisiloxane as described by Willing in U.S. Pat. No. 3,419,593, issued Dec. 31, 1968; alkene complexes described by Ashby in U.S. Pat. No. 3,159,601, issued Dec. 1, 1964, and U.S. Pat. No. 3,159,662, issued Dec. 1, 1964; the platinum acetylacetonate described by Baney in U.S. Pat. No. 3,723,497, issued Mar. 27, 1973; the platinum alcoholates described by Lamoreaux in U.S. Pat. No. 3,220,972, issued Nov. 30, 1965; and in many more patents which describe various types of platinum catalysts. These patents describing platinum catalysts are hereby incorporated by reference to show the platinum catalysts and to show the hydrosilylation reaction.

The vinyl-containing polysiloxane, (A), the polyfunctional hydrogen polysiloxane, (B), and the platinum catalyst (C) are combined and are reacted until the vinyl radical disappears. This reaction takes place at room temperature, but for practical purposes, the reaction mixture is heated to a temperature above 50° C., preferably above 100° C. to reduce the time of the reaction. The reaction is continued until the vinyl radical is, for all practical purposes, completely reacted. The time to complete this reaction is usually at least one hour, but at higher temperatures the reaction may be completed in shorter time periods. The reaction mixture should not be heated above the decomposition temperature of the polysiloxanes of (A) and (B). For ensuring that the reaction components are compatible during the reaction (II), an organic solvent can be used. Organic solvent can be toluene and xylene, for example. The amount of organic solvent which is practical is from about 10 weight percent to about 60 weight percent.

After the reaction product of (II) is obtained, an aliphatically unsaturated azasilacycloalkane is added thereto in an amount of at least one molecule of azasilacycloalkane per unreacted SiH group in reaction product (II). The addition of the azasilacycloalkane to the reaction product of (II) is preferably carried out by slowly adding the azasilacycloalkane over a period of time to the reaction product of (II) which is at a temperature of at least 75° C., preferably above 100° C., over a time period of at least one hour. The azasilacycloalkane reacts with the unreacted SiH of the reaction product of (II) by an addition reaction (hydrosilylation reaction). The platinum catalyst which was present of the reaction of (A) and (B) also catalyzes the reaction of the aliphatic unsaturation of the azasilacycloalkane with the unreacted SiH groups of reaction product (II). This reaction of the azasilacycloalkane with the SiH of reaction product (II) is preferably carried out at a temperature of at least 75° C., more preferably at least 100° C. for a period of time of at least one hour. The resulting product of this reaction, step (IV), produces the cluster azasilacycloalkyl functional polysiloxane. At this point, the cluster azasilacycloalkyl functional polysiloxane may contain unreacted materials and solvent. To obtain the cluster azasilacycloalkyl functional polysiloxane in a purer form, the product of (IV) is stripped at a temperature of greater than 100° C. at a pressure of less than 1 mm Hg.

The cluster azasilacycloalkyl functional polysiloxanes obtained by the process of this invention are sensitive to moisture because the Si—N bond of the azasilacycloalkyl group hydrolyzes rapidly in contact with moisture. In view of this, the process of this invention should be under conditions which prevents the ingress of moisture or water into the process. Also the resulting cluster azasilacycloalkyl functional polysiloxane should be stored under conditions which protect it from exposure to moisture until such time that one desires to have the cluster azasilacycloalkyl functional polysiloxanes crosslink and cure.

The cluster azasilacycloalkyl functional polysiloxanes of the present invention are polysiloxanes which are stable at room temperature when protected from moisture, but polymerize when exposed to moisture in such a manner that no volatile or leachable by-products are produced. They polymerize via a water induced ring opening reaction of the azasilacycloalkane which yields a silanol and an aminoalkyl group. This silanol can either open another ring, creating a siloxane linkage; or condense with another silanol, resulting in a siloxane linkage and a molecule of water. The aminoalkyl group is "tethered" to a silicon atom via a bridge of a covalently bonded divalent hydrocarbon radical. Tethered means that all of the covalent bonds (Si—C) of the bridging chain are relatively stable to hydrolysis when compared to the hydrolyzable bond (Si—N).

The cluster azasilacycloalkyl functional polysiloxanes contain at least four azasilacycloalkyl groups bonded to the polysiloxane reaction product (the azasilacycloalkyl group replaces the Si—H group). The azasilacycloalkyl groups are illustrated by the following formulae

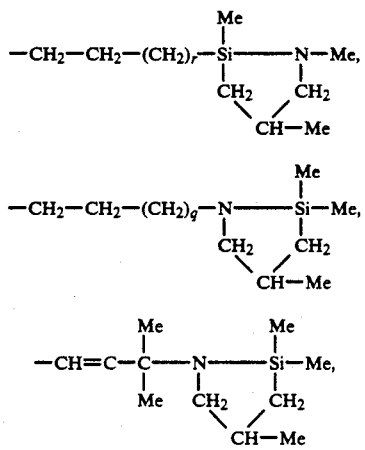

-continued

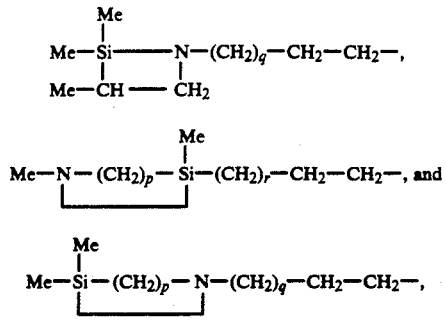

in which Me is methyl, q has a value of 1 to 4 inclusive, r has a value of 0 to 4 inclusive, and p has a value of 4 to 6 inclusive.

The azasilacycloalkanes used in the process of this invention are aliphatic unsaturated azasilacycloalkanes and have the general formula

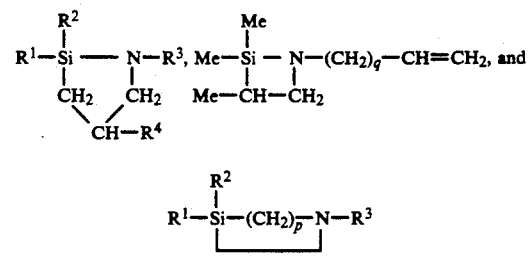

in which q has a value of 1 to 4 inclusive, p has a value of 4 to 6 inclusive, each of $R^1$, $R^2$, and $R^3$ is independently selected from the group consisting of a hydrogen atom, methyl, and an aliphatic unsaturated monovalent hydrocarbon radical, where one of $R^1$, $R^2$, and $R^3$ is a monovalent hydrocarbon radical with olefinic unsaturation or acetylenic unsaturation. The monovalent hydrocarbon radicals include vinyl, allyl, butenyl, pentenyl, and hexenyl. $R^4$ is a hydrogen atom or methyl. Preferably, $R^1$, $R^2$, or $R^3$, when an olefinically or acetylenically unsaturated monovalent hydrocarbon radical, is olefinic and is either vinyl, allyl, or hexenyl.

The aliphatically unsaturated azasilacyclopentanes can be prepared from an dialkoxy(chloroalkyl)silane of the general formula

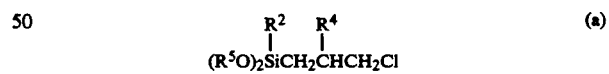

where $R^5$ is an alkyl radical of from 1 to 5 carbon atoms per molecule, including methyl, ethyl, propyl, isopropyl, butyl, isobutyl, and pentyl, by first making a monoalkoxyalkylalkenyl(3-chloro-2-alkylpropyl)silane of the general formula

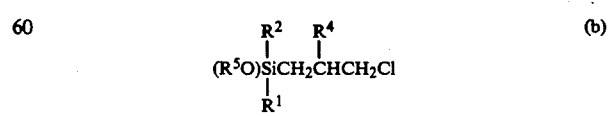

by reacting silane (a) with a Grignard reagent of the general formula $R^1MgX$, where X is chlorine, bromine, or iodine, or LiX reagent in the presence of an ether such as diether ether, tetrahydrofuran, or a mixture thereof. One preferred monoalkoxyalkylalkenyl(3-chloro-2-alkylpropyl)silane is methoxymethylvinyl(3-chloro-2-methylpropyl)silane. After the silane (b) is obtained, it can be reacted with acetyl chloride in the presence of a Lewis acid, preferably ferric chloride to make a chloroalkylalkenyl(3-chloro-2-alkylpropyl)silane of the general formula

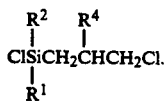 (c)

One preferred chloroalkylalkenyl(3-chloro-2-alkylpropyl)silane is chloromethylvinyl(3-chloro-2-methylpropyl)silane.

The aliphatically unsaturated azasilacyclopentanes can then be made by a process described by Speier in U.S. Pat. No. 3,146,250, issued Aug. 25, 1964, where a halogenoalkylhalogenosilane of the formula

is reacted with an amino compound of the formula $RNH_2$. For example, the aliphatically unsaturated azasilacyclopentanes can be made by reacting an alkenylamine with a silane of formula (c). Speier is hereby incorporated by reference to show the known general reaction of chlorosilanes with an amino compound to make certain nitrogen-containing compounds as described herein.

Preferred azasilacycloalkanes are selected from the group consisting of

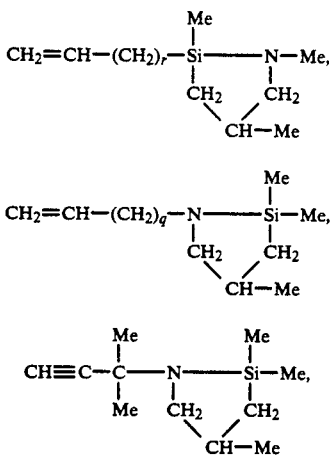

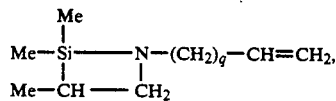

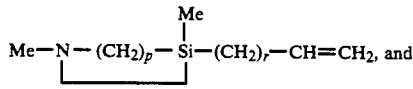

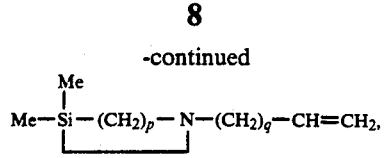

in which Me is methyl, q has a value of 1 to 4 inclusive, r has a value of 0 to 4 inclusive, and p has a value of 4 to 6 inclusive.

The aliphatic unsaturated azasilacyclopentanes of the following formulae

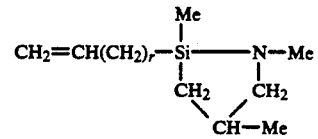

and

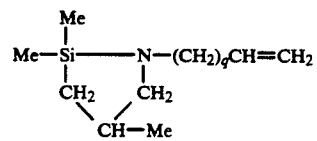

in which r has a value of from 0 to 4 inclusive; q has a value of from 1 to 4 inclusive; and Me is methyl radical are described in our U.S. Pat. No. 5,136,064, issued Aug. 4, 1992, and is hereby incorporated by reference to show these azasilacyclopentanes and their preparation.

The aliphatic unsaturated azasilacyclopentane of the following formula

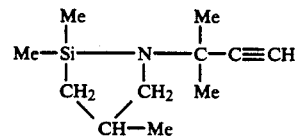

can be prepared by the method described in our U.S. Pat. No. 5,136,064, where the reaction for the preparation is

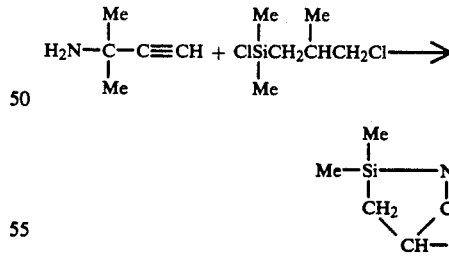

The azasilacyclobutanes of the following formula

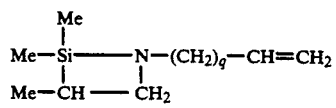

where q has a value of 1 to 4 inclusive, can be prepared by a method as illustrated by the following: Diallylamine was reacted with chlorodimethylsilane in heptane in the presence of triethylamine to give diallylaminodimethylsilane as shown by the following equation

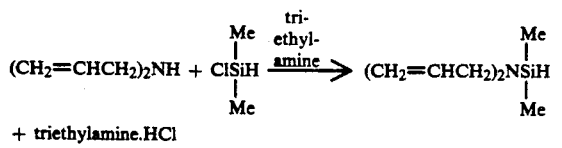
+ triethylamine.HCl

The silane product was obtained by ambient pressure distillation after removal of triethylamine hydrochloride by filtration. 1-allyl-2,2,3-trimethyl-1-aza-2-silacyclobutane was made by intramolecular hydrosilation of the diallyldimethylsilane. This reaction was carried out at 80° C. in the presence of PtCl$_2$(PPh$_3$)$_2$ in benzene. The starting material was consumed in four hours to give a product mixture of 83 mole percent of the azasilacyclobutane and 17 mole percent of azasilacyclopentane as illustrated by the following equation

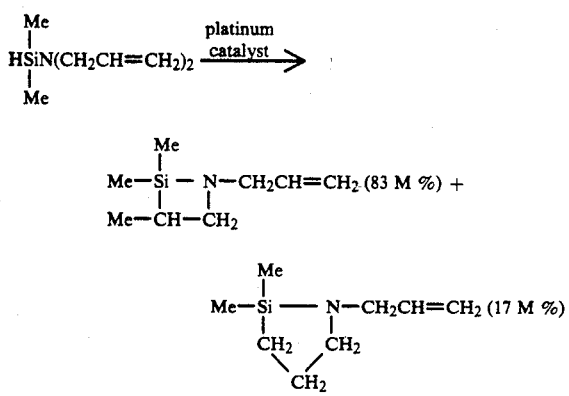

Total yield of product was 77 weight percent.

The azasilacycloalkane of the formula

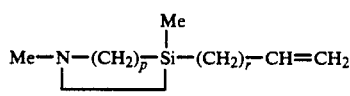

where r has a value of 0 to 4 inclusive and p has a value of 4 to 6 inclusive, for example, 2-vinyl-1,2-dimethyl-1-aza-2-silacycloalkane, can be made by reacting

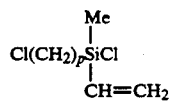

with methylamine using the procedure described in U.S. Pat. No. 3,146,250, issued Aug. 25, 1964, to Speier which is hereby incorporated by reference to show a method of preparation for azasilacycloalkanes. The chlorosilane of the formula

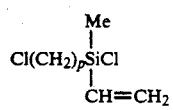

can be made by reacting

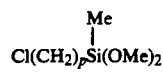

with vinyl magnesium bromide, followed by reaction with acetyl chloride in the presence of ferric trichloride catalyst. The methoxysilane of the formula

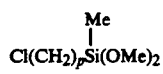

can be made by reacting

with CH$_2$=CH—(CH$_2$)$_{(p-2)}$Cl in the presence of a platinum catalyst. Other reactions are describe in an article by Speier et al, in the Journal of Organic Chemistry, vol. 36, pages 3120–3126, (1971), entitled "Syntheses of (3-Aminoalkyl)silicon Compounds."

The azasilacycloalkane of the following formula

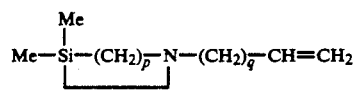

where q has a value of 1 to 4 inclusive and p has a value of 4 to 6 inclusive, for example, 1-allyl-2,2-dimethyl-1-aza-2-silacycloalkanes can be made by reacting

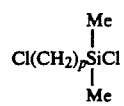

with CH$_2$=CHCH$_2$NH$_2$ using a procedure described in U.S. Pat. No. 3,146,250. The chlorosilane of the formula

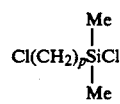

can be made by reacting

with CH$_2$=CH(CH$_2$)$_{(p-2)}$Cl in the presence of a platinum catalyst.

The above aliphatically unsaturated azasilacycloalkanes are reacted with the unreacted Si—H groups of the reaction product of (II) in the presence of a platinum catalyst, preferably with heating. The reactions of the azasilacycloalkanes with the Si—H group are illustrated by the following equations representative of the reactions Equation 1:

-continued
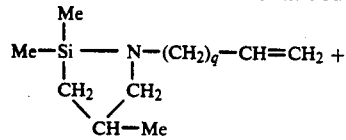
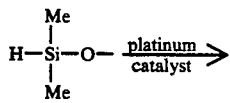
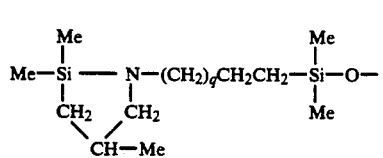
Equation 2:
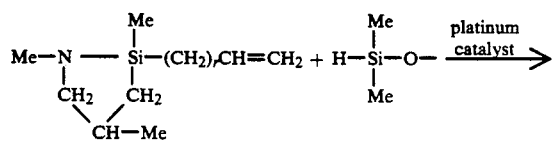
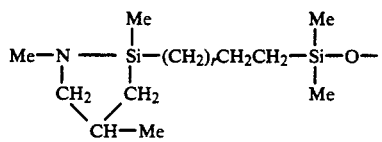
Equation 3:
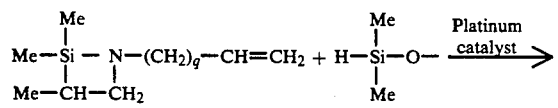
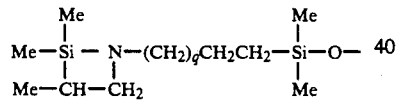
Equation 4:
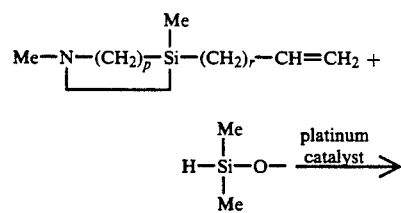
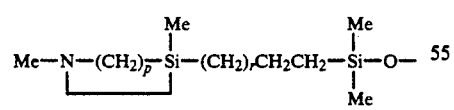
Equation 5:
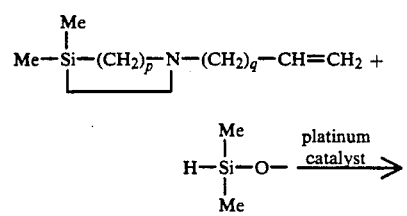
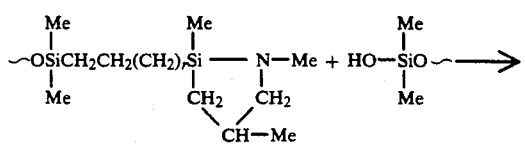
-continued
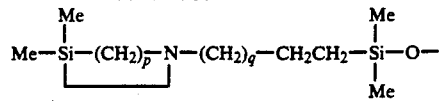
Equation 6:
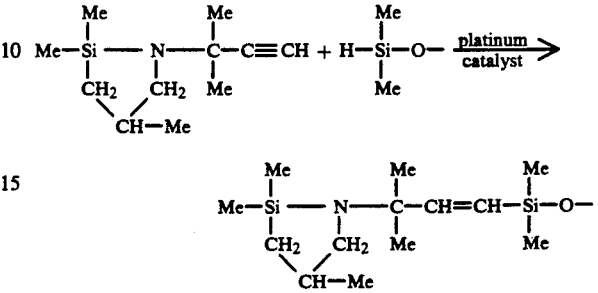
The azasilacycloalkyl groups of the cluster azasilacycloalkyl functional polysiloxanes of this invention are believed to react in the following manners using the azasilacyclopentane polysiloxanes to illustrate the reactions:
(1) with water
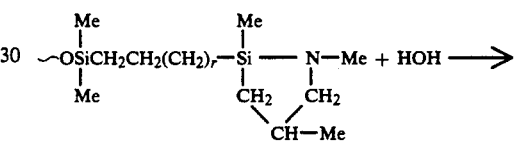
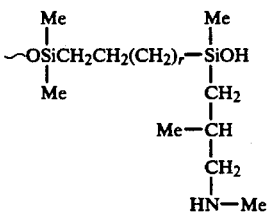
or,
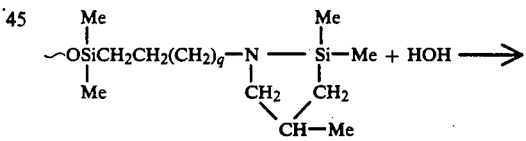
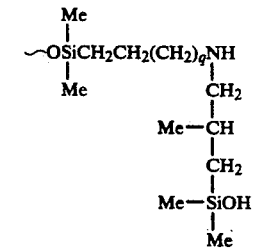
(2) with silanol, ≡Si—OH
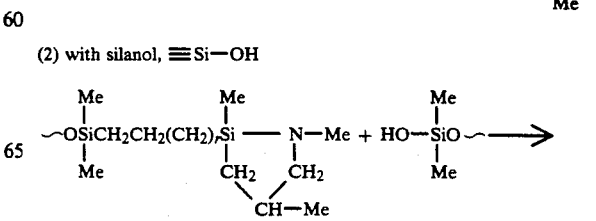

-continued

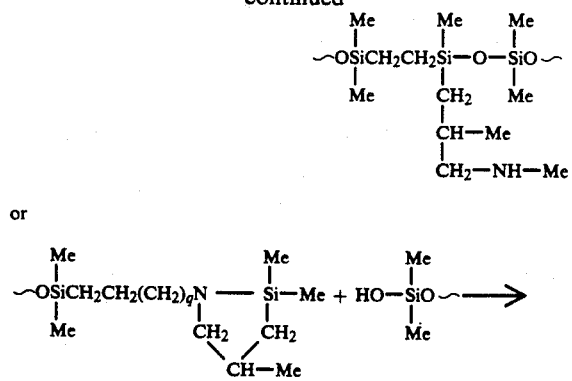

spectively "part by weight" and "parts by weight", Me=methyl, Ph=phenyl, and Vi=vinyl.

SYNTHESIS

Preparation of 2,2,4-Trimethyl-1-allyl-1-aza-2-silacyclopentane 2,2,4-Trimethyl-1-allyl-1-aza-2-silacyclopentane was prepared as follows. Chlorodimethyl(3-chloro-2-methylpropyl)silane (100 g, 0.54 mol) was slowly added to 211.73 g (3.71 mol, 6.87 eq) of undistilled allyl amine resulting in an exothermic reaction. This reaction mixture was stirred at room temperature for 15 hours, heated to reflux at atmospheric pressure for 72 hours, and heated to 120° C. under about 344.7 kPa gauge pressure for 16 hours. The following GC-MS ratios shown in the Table exemplified the reactions progression and the spectra observed were as shown.

TABLE

| RETENTION TIME, MIN | 15 HOURS 20° C. | 24 HOURS REFLUX | 72 HOURS REFLUX | 16 HOURS 120° C. | COMPOUND |
|---|---|---|---|---|---|
| 2.70 | 0.0 | 3.9 | 21.3 | 71.9 | E |
| 2.82 | 0.0 | 1.0 | 1.1 | 0.9 | F |
| 3.20 | 50.4 | 11.0 | 4.1 | 0.0 | G |
| 5.19 | 29.5 | 63.0 | 40.2 | 0.0 | H |
| 8.46 | 20.0 | 8.8 | 8.1 | 2.4 | I |
| 9.58 | 0.0 | 9.3 | 10.1 | 6.1 | J |
| 10.58 | 0.0 | 3.1 | 15.1 | 18.7 | K |

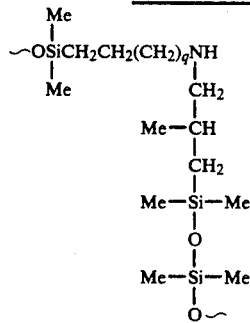

The cluster azasilacycloalkyl functional polysiloxanes, which are storage stable in a package when protected from moisture but polymerize and cure when removed from the package and exposed to moisture of the atmosphere, can be mixed with polyorgano-siloxanes having silicon-bonded hydroxyl groups (silanols, Si—OH) to form cured products or mixed with other crosslinkers and chain extenders such as acetoxysilanes. These cluster azasila-cyclopentane polysiloxanes can contain fillers and other ingredients which are useful in the preparation of cured silicone products such as elastomers, encapsulants, sealants, and resins. Such additives should not cause premature reaction or cause gellation in the package or cause the azasilacyclo-alkane group to be unavailable for reaction when the composition is removed from the package and is exposed to moisture, preferably to atmospheric moisture. Fillers which may be useful are illustrated by reinforcing silica, surface treated reinforcing silica, calcium carbonate, and carbon black. Curing catalysts might be useful and can be illustrated by dibutyltin diacetate, dibutyltin dilaurate, tetrabutyl titanate, tetraisopropyl titanate, stannous octoate, and bis(ethoxyaceto-acetonate) diisopropoxy titanium (IV).

The following synthesis and example are presented for illustrative purposes and should not be construed as limiting the invention which is delineated in the claims. In the following examples, "part" and "parts" are re- Compound E was 2,2,4-trimethyl-1-allyl-1-aza-2-silacyclopentane and the spectra was 169 (819), M+; 154 (1326), M+-CH$_3$; 142 (1074), M+-Vi; 127 (375), M+-C$_3$H$_6$; 126 (354), M+-C$_3$H$_7$; 100 (784), M-69; 86 (8734), Me$_2$SiN=CH$_2$+; 59 (10000), Me$_2$SiH+. Compound F was not determined.

Compound G was chlorodimethyl(3-chloro-2-methylpropylsilane and the spectra was 184 (0), M+; 169 (233), M+-Me; 137 (292), M+-47; 113 and 115 (2459 and 1991), Cl$_2$MeSi+; 93 (9786), ClMe$_2$Si+; 56 (10000), C$_4$H$_8$.

Compound H was allylaminodimethyl(3-chloro-2-methylpropyl)silane and the spectra was 205 (10), M+; 190 (79), M+-Me; 170 (153), M+-Cl; 149 (618), M+-C$_4$H$_8$; 134 and 136 (1263 and 508), M+-CH$_3$-C$_4$H$_8$; 120 and 122 (1250 and 625), unassigned; 114 (10000), CH$_2$=CHCH$_2$NHSiMe$_2$+; 98 (4709), unassigned; 93 and 95 (4999 and 1948), ClMe$_2$Si+.

Compound I was 1,1,3,3-tetramethyl-1,3-bis(3-chloro-2-methylpropyl)disiloxane and the spectra was 314 (0), M+; 187 and 189 (2045 and 1291), ClMe$_2$SiOSiMeCl+; 167 and 169 (10000 and 3897), ClMe$_2$SiOSiMe$_2$+.

Compound J was 1,1,3,3-tetramethyl-1-(3-chloro-2-methylpropyl)-1-(3-allylamino-2-methylpropyl)disiloxane and the spectra was 335 (0), M+; 320 (52), M+-Me; 167 and 169 (1216 and 463), ClMe$_2$SiOSiMe$_2$+; 70 (10000), CH$_2$=CHCH$_2$NH=CH$_2$+.

Compound K was 1,1,3,3-tetramethyl-1,3-bis(3-allylamino-2-methylpropyl)disiloxane and the spectra was 356 (0), M+; 170 (1017), CH$_2$=CHCH$_2$NHCH$_2$CH(CH$_3$)CH$_2$SiMe$_2$+; 169 (1177), peak 170-H; 70 (10000), CH$_2$=CHCH$_2$NH=CH$_2$+.

Upon cooling the product of the reaction, a two phase system resulted. The upper phase weighed 111.85 g and contained most of the product 2,2,4-trimethyl-1-allyl-1-aza-2-silacyclopentane. The lower phase weighed 177.12 g and was an amber viscous liquid. This lower phase was concentrated at atmospheric pressure with a pot temperature of 120° C. to 122 g. Another 4.0 g of the upper phase was separated upon cooling. The combined product phases were distilled under vacuum. After a slow evolution of allylamine, the product codistilled with an ammonium salt at 78° C. and 30 mmHg. Filtration gave 51.63 g (56% yield) of essentially pure 2,2,4-trimethyl-1-allyl-1-aza-2-silacyclopentane. The $^{13}$C NMR was: 138.13, vinyl; 114.39, vinyl; 58.98, allyl CH$_2$; 50.31, ring CH$_2$N; 31.88, CH; 21.94 and 21.50, SiCH$_2$ and C-Me; 0.22 and −0.76, SiMe. The $^{29}$Si NMR spectra had one peak at 15.56 ppm relative to tetramethylsilane.

EXAMPLE

To 50 g (9.0 mEq SiVi) of a vinyl endblocked polydimethylsiloxane of the formula

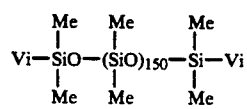

dissolved in 50 g of toluene was added 0.05 g of a complex of chloroplatinic acid and syn-divinyltetramethyldisiloxane having about 0.7 weight percent platinum and 8.90 g (27.1 mmol) of tetrakis(dimethylsiloxy)silane. The resulting combination was reacted by heating for 4 hours at 110° C. To the resulting reaction product at 140° C., 22.9 g (135 mmol) of 2,2,4-trimethyl-1-allyl-1-aza-2-silacyclopentane (as prepared in the above synthesis) was slowly added over a two hour period. This mixture was then heated at 140° C. for 12 hours and then 15 g of poly(dimethylsiloxane) cyclic pentamer (used as a process aid) was added. The resulting reaction product was then stripped to a final temperature of 180° C. at 0.03 mm Hg. The yield was 75.1 g of a cluster azasilacyclopentane polysiloxane having a general formula

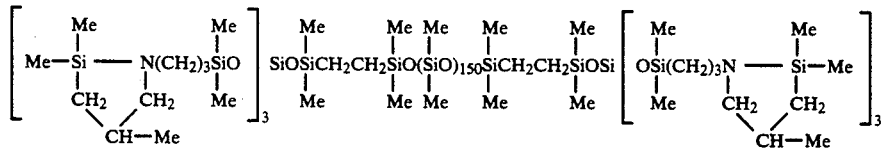

This material skinned over after 6 minutes exposure to an atmosphere at ambient temperature and 44% relative humidity. After two days under these conditions, the product had cured to an elastomer.

That which is claimed is:

1. A process for the preparation of a cluster azasilacycloalkyl functional polysiloxane comprising (I) combining (A) a vinyl-containing polysiloxane selected from the group consisting of

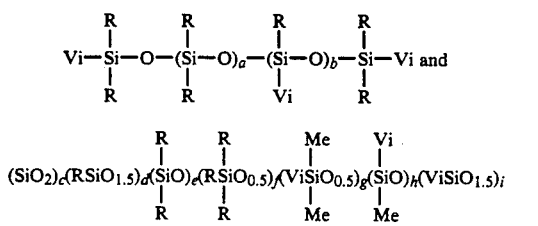

in which each R is an independently selected monovalent hydrocarbon radical or halogenated hydrocarbon radical, Vi is vinyl radical, Me is methyl radical, a has an average value of from 0 to 1000, b has an average value of from 0 to 10, the value of c, d, e, f, g, h, and i being such that the ratio of (R+Me+Vi) per Si is in the range of from 0.5 to 1.8 and the value of g, h, and i being such that there is at least two Vi per molecule, with (B) polyfunctional hydrogen polysiloxane selected from the group consisting of

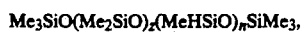

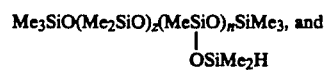

which R has the same meaning as defined for ingredient (A), x has an average value of from 3 to 10 inclusive, y has an average value of from 0 to 100, n has an average value of from 3 to 10 inclusive and m has an average value of from 1 to 10 inclusive, in the presence of (C) a platinum catalyst for the reaction of vinyl with silicon-bonded hydrogen, wherein the ratio of SiH in (B) to the Si—Vi in (A) exceeds 1.5:1, (II) reacting (A) with (B) in the presence of (C) to obtain a reaction product in which the vinyl radical in (A) reacts with the SiH of (B) to produce ≡Si—CH$_2$CH$_2$—Si≡ bonds, and there remains unreacted SiH groups in the reaction product, and thereafter (III) adding an azasilacycloalkane selected from the group consisting of

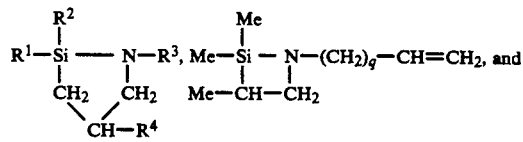

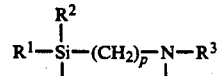

in which q has a value of 1 to 4 inclusive, p has a value of 4 to 6 inclusive, each of R$^1$, R$^2$, and R$^3$ is independently selected from the group consisting of a hydrogen atom, methyl, and an aliphatic unsaturated monovalent hydrocarbon radical, where one of R$^1$, R$^2$, and R$^3$ is a monovalent hydrocarbon radical with olefinic unsaturation or acetylenic unsaturation, and R$^4$ is a hydrogen atom or methyl, wherein there is at least one molecule of azasilacycloalkane per unreacted SiH in the reaction product of (II), and (IV) reacting the azasilacycloalkane with the reaction product of (II) forming a cluster azasilacycloalkyl functional polysiloxane.

2. A process for the preparation of a cluster azasilacycloalkyl functional polysiloxane comprising (I) combining (A) a vinyl-containing polysiloxane selected from the group consisting of

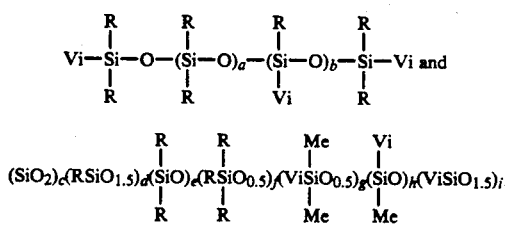

in which R is a monovalent hydrocarbon radical or halogenated hydrocarbon radical, Vi is vinyl radical, Me is methyl radical, a has an average value of from 0 to 1000, b has an average value of from 0 to 10, the value of c, d, e, f, g, h, and i being such that the ratio of (R+Me+Vi) per Si is in the range of from 0.5 to 1.8 and the value of g, h, and i being such that there is at least two Vi per molecule, with (B) polyfunctional hydrogen polysiloxane selected from the group consisting of

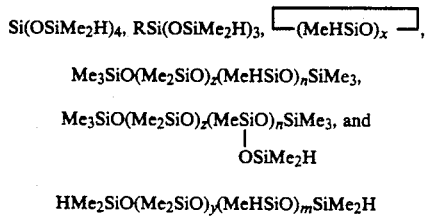

in which R has the same meaning as defined for ingredient (A), x has an average value of from 3 to 10 inclusive, y has an average value of from 0 to 100, n has an average value of from 3 to 10 inclusive and m has an average value of from 1 to 10 inclusive, in the presence of (C) a platinum catalyst for the reaction of vinyl with silicon-bonded hydrogen, wherein the ratio of SiH in (B) to the Si—Vi in (A) exceeds 1.5:1, (II) reacting (A) with (B) in the presence of (C) to obtain a reaction product in which the vinyl radical in (A) reacts with the SiH of (B) to produce ≡Si—CH$_2$CH$_2$—Si≡ bonds, and there remains unreacted SiH groups in the reaction product, and thereafter (III) adding an azasilacycloalkane selected from the group consisting of

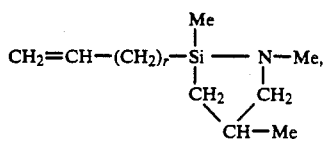

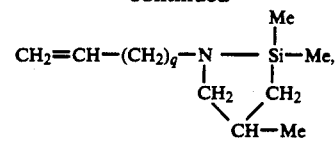

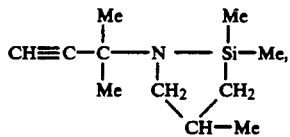

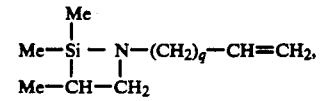

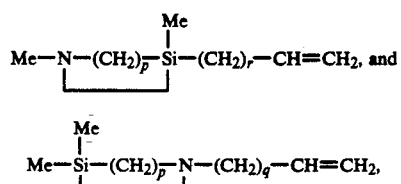

in which Me is methyl, g has a value of 1 to 4 inclusive, r has a value of 0 to 4 inclusive, and p has a value of 4 to 6 inclusive, wherein there is at least one molecule of azasilacycloalkane per unreacted SiH in the reaction product of (II), and (IV) reacting the azasilacycloalkane with the reaction product of (II) forming a cluster azasilacycloalkyl functional polysiloxane.

3. The process in accordance with claim 2 in which the combination of (A), (B), and (C) also comprises an organic solvent.

4. The process in accordance with claim 2 in which the ratio of (A) to (B) is such that there is at least one molecule of (B) per vinyl radical in (A).

5. The process in accordance with claim 2 in which (A) and (B) are reacted in (II) at a temperature of >50° C. for >1 hour, the azasilacycloalkane of (III) is slowly added over a time period of at least one hour to the reaction product of (II) which is at a temperature of >75° C., and the cluster azasilacycloalkane is obtained in (IV) by heating the reaction product of (II) with the azasilacycloalkane at a temperature >75° C. for at least one hour.

6. The process in accordance with claim 3 in which (A) and (B) are reacted in (II) at a temperature of >50° C. for >1 hour, the azasilacycloalkane of (III) is slowly added over a time period of at least one hour to the reaction product of (II) which is at a temperature of >75° C., and the cluster azasilacycloalkane is obtained in (IV) by heating the reaction product of (II) with the azasilacycloalkane at a temperature >75° C. for at least one hour.

7. The process in accordance with claim 4 in which (A) and (B) are reacted in (II) at a temperature of >50° C. for >1 hour, the azasilacycloalkane of (III) is slowly added over a time period of at least one hour to the reaction product of (II) which is at a temperature of >75° C., and the cluster azasilacycloalkane is obtained in (IV) by heating the reaction product of (II) with the azasilacycloalkane at a temperature >75° C. for at least one hour.

8. The process in accordance with claim 5 in which (A) and (B) are reacted in (II) at a temperature of >100° C. for >1 hour, the azasilacycloalkane of (III) is slowly added over a time period of at least one hour to the reaction product of (II) which is at a temperature of >100° C., and the cluster azasilacycloalkane is obtained in (IV) by heating the reaction product of (II) with the azasilacycloalkane at a temperature >100° C. for at least one hour.

9. The process in accordance with claim 6 in which (A) and (B) are reacted in (II) at a temperature of >100° C. for >1 hour, the azasilacycloalkane of (III) is slowly added over a time period of at least one hour to the reaction product of (II) which is at a temperature of >100° C., and the cluster azasilacycloalkane is obtained in (IV) by heating the reaction product of (II) with the azasilacycloalkane at a temperature >100° C. for at least one hour.

10. The process in accordance with claim 7 in which (A) and (B) are reacted in (II) at a temperature of >100° C. for >1 hour, the azasilacycloalkane of (III) is slowly added over a time period of at least one hour to the reaction product of (II) which is at a temperature of >100° C., and the cluster azasilacycloalkane is obtained in (IV) by heating the reaction product of (II) with the azasilacycloalkane at a temperature >100° C. for at least one hour.

11. The process in accordance with claim 2 further comprising (V) stripping the reaction product of (IV) at a temperature of >100° C. and at a pressure of <1 mm Hg to obtain a cluster azasilacycloalkyl functional polysiloxane.

12. The process in accordance with claim 10 further comprising (V) stripping the reaction product of (IV) at a temperature of >100° C. and at a pressure of <1 mm Hg to obtain a cluster azasilacycloalkyl functional polysiloxane.

13. The process in accordance with claim 11 further comprising (VI) storing the product obtain from stripping step (V) under conditions which protects it from moisture.

14. The process in accordance with claim 12 further comprising (VI) storing the product obtain from stripping step (V) under conditions which protects it from moisture.

15. The process in accordance to claim 2 in which (A) has the following average formula

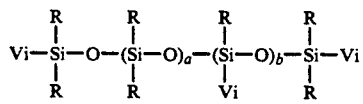

in which b is 0 and a has an average value of from 50 to 500.

16. The process in accordance to claim 15 in which (B) is Si(OSiMe$_2$H)$_4$.

17. The process in accordance to claim 3 in which (A) has the following average formula

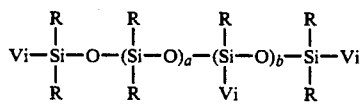

in which b is 0 and a has an average value of from 50 to 500.

18. The process in accordance to claim 17 in which (B) is Si(OSiMe$_2$H)$_4$.

19. The process in accordance to claim 4 in which (A) has the following average formula

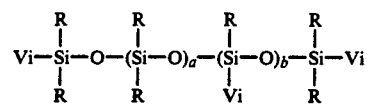

in which b is 0 and a has an average value of from 50 to 500.

20. The process in accordance to claim 19 in which (B) is Si(OSiMe$_2$H)$_4$.

21. The process in accordance to claim 7 in which (A) has the following average formula

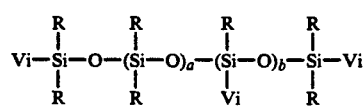

in which b is 0 and a has an average value of from 50 to 500.

22. The process in accordance to claim 21 in which (B) is Si(OSiMe$_2$H)$_4$.

23. The process in accordance to claim 10 in which (A) has the following average formula

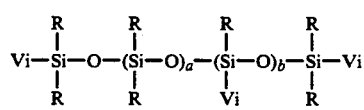

in which b is 0 and a has an average value of from 50 to 500.

24. The process in accordance to claim 23 in which (B) is Si(OSiMe$_2$H)$_4$.

25. The process in accordance to claim 12 in which (A) has the following average formula

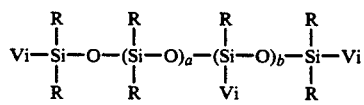

in which b is 0 and a has an average value of from 50 to 500.

26. The process in accordance to claim 25 in which (B) is Si(OSiMe$_2$H)$_4$.

27. The process in accordance to claim 14 in which (A) has the following average formula

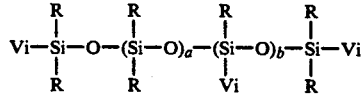

in which b is 0 and a has an average value of from 50 to 500.

28. The process in accordance to claim 27 in which (B) is Si(OSiMe$_2$H)$_4$.

29. A product obtained from the process of claim 1.
30. A product obtained from the process of claim 2.
31. A product obtained from the process of claim 10.
32. A product obtained from the process of claim 11.
33. A product obtained from the process of claim 12.

34. A product obtained from the process of claim 13.

35. A product obtained from the process of claim 14.

36. A product obtained by exposing the product of claim 17 to moisture and obtaining a cured product.

37. A product obtained by exposing the product of claim 18 to moisture and obtaining a cured product.

38. A product obtained by exposing the product of claim 19 to moisture and obtaining a cured product.

* * * * *